United States Patent
Chu et al.

(10) Patent No.: US 8,307,457 B2
(45) Date of Patent: Nov. 6, 2012

(54) METHOD AND TERMINAL FOR RECEIVING RIGHTS OBJECT FOR CONTENT ON BEHALF OF MEMORY CARD

(75) Inventors: Youn-Sung Chu, Seoul (KR); Seung-Jae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 12/696,039

(22) Filed: Jan. 28, 2010

(65) Prior Publication Data

US 2010/0205439 A1 Aug. 12, 2010

Related U.S. Application Data

(60) Provisional application No. 61/148,053, filed on Jan. 29, 2009, provisional application No. 61/170,113, filed on Apr. 17, 2009, provisional application No. 61/185,988, filed on Jun. 10, 2009, provisional application No. 61/187,284, filed on Jun. 16, 2009, provisional application No. 61/286,740, filed on Dec. 15, 2009.

(30) Foreign Application Priority Data

Oct. 26, 2009 (KR) .......................... 10-2009-0101947
Nov. 2, 2009 (KR) .......................... 10-2009-0105146

(51) Int. Cl.
*G06F 7/04* (2006.01)
(52) U.S. Cl. .......................................... 726/29; 713/169
(58) Field of Classification Search .................... 726/10, 726/29; 713/169
See application file for complete search history.

(56) References Cited

U.S. PATENT DOCUMENTS

| | | | |
|---|---|---|---|
| 2003/0065866 A1* | 4/2003 | Spencer | 710/306 |
| 2005/0210249 A1 | 9/2005 | Lee et al. | |
| 2005/0216739 A1 | 9/2005 | Lee et al. | |
| 2006/0059094 A1 | 3/2006 | Oh et al. | |
| 2007/0157318 A1* | 7/2007 | Lee et al. | 726/27 |
| 2008/0046758 A1* | 2/2008 | Cha et al. | 713/189 |
| 2009/0006845 A1 | 1/2009 | Charbonnier et al. | |
| 2010/0049971 A1 | 2/2010 | Oh | |

FOREIGN PATENT DOCUMENTS

| | | |
|---|---|---|
| WO | WO-2005/091162 A1 | 9/2005 |
| WO | WO 2007-055539 A1 | 5/2007 |

OTHER PUBLICATIONS

"Standardization of OMA DRM-Technologies for Handling Digital Content Distribution and Copyright Management-", NTT DoCoMo Technical Journal vol. 6 No. 4, pp. 43-50.

Open Mobile Alliance, "OMA Secure Removable Media Specification" Draft Version 1.0, XP007913420, Jan. 19, 2009, pp. 1-139.

\* cited by examiner

*Primary Examiner* — Cordelia Zecher
(74) *Attorney, Agent, or Firm* — Birch, Stewart, Kolasch & Birch, LLP

(57) ABSTRACT

Disclosed is a method of receiving by a terminal a rights object (RO) from a rights issuer (RI) on behalf of a memory card, the method including, receiving, by the terminal, a trigger message for RO acquisition from the rights issuing server, comparing, by the terminal, trust anchor and ID of the memory card in a list included in the trigger message with a trust anchor and ID of the memory card within a context of the terminal, transmitting, by the terminal, a RO request message to the rights issuing server if the trust anchor and the ID of the memory card within the context are consistent with those within the list according to the comparison result, and receiving, by the terminal, a RO response message including a protected RO from the rights issuing server.

10 Claims, 10 Drawing Sheets

METHOD AND TERMINAL FOR RECEIVING RIGHTS OBJECT FOR CONTENT ON BEHALF OF MEMORY CARD

CROSS-REFERENCE TO RELATED APPLICATION

The present application is related to and claims the benefit of U.S. Provisional Application No. 61/148,053 filed on Jan. 29, 2009 and No. 61/170,113 filed on Apr. 17, 2009, No. 61/185,988 filed on Jun. 10, 2009, and No. 61/187,284 filed on Jun. 16, 2009 and the benefit of earlier filing date and right of priority to Korean Applications No. 10-2009-0105146, filed on Nov. 2, 2009, the entire contents of which being incorporated herein by reference.

BACKGROUND OF THE INVENTION

1. Field of the Invention

The present invention relates to digital rights management (DRM), and particularly, to a method for securely issuing a rights object to a memory card in a DRM environment.

2. Background of the Invention

Digital Rights Management (DRM) is a technology for safely protecting and systematically managing a rights object for digital contents (e.g., music, movies, literature, images, etc.). DRM prevents unauthorized and/or illegal copying of digital contents. DRM also provides for the acquisition of rights object (RO) for DRM contents, production and distribution of DRM contents, and protection and management for a series of usage processes.

FIG. 1 shows a general structure of a conventional DRM system.

The conventional DRM system controls how a user receives and processes received digital contents in accordance with a RO given to the user. In this respect, the contents provider is an entity corresponding to a contents issuer (CI) 30 and/or a rights issuer (RI) 40.

The CI 30 issues protected contents (referred to hereinafter as 'DRM contents' (or 'digital contents')) by using a particular coding key to protect the contents from viewing or processing by a non-authorized user, and the RI 40 issues the RO required for allowing use of the DRM contents.

A terminal 10 includes a DRM agent. The DRM agent receives DRM contents from the CI 30, receives a RO with respect to the contents from the RI 40, and interprets permission and/or constraint included in the RO to control the use of the DRM contents by the corresponding terminal.

In general, the RO is coded by a public key of a particular terminal, so arbitrary terminal other than a terminal having a private key cannot decode or use the DRM contents related to the RO.

Thus, in a conventional DRM system, even though the RO and its associated DRM contents are copied into a mobile memory card such as a multimedia card and the like, an arbitrary terminal other than a particular terminal for which the RO has been properly issued cannot read the DRM contents from the memory card. That is, the RO is dependent upon the particular terminal.

In addition, in the conventional DRM system, because the RO is issued for the particular terminal, if the memory card stores the RO and its DRM contents, only the particular terminal properly having the issued RO can read the DRM contents and the RO from the SRM. Thus, only the particular terminal properly having the issued RO can use the DRM contents.

Also, in the conventional DRM system, the RI 40 cannot issue a RO with respect to the DRM contents to the memory card. Thus, the memory card cannot have the RO in its name.

Further, in the conventional DRM system, the RI 40 can neither know a trust anchor negotiated between the DRM agent of the terminal and the memory card nor ID of the memory card. Thus, the memory card, cannot have the RO in its name.

FIG. 2 shows problems according to the related art.

As shown in FIG. 2, the CI 30 issues contents to a first terminal 11. The RI 40 issues RO with respect to the contents to the first terminal 11. The terminal 11 exports the RO and copies the RO into the memory card 15.

Accordingly, although the user of the first terminal 11 hands over the memory card 15, to a second terminal 12, the second terminal 12 cannot use the contents in the memory card 15 because the RO in the memory card 15 is issued to the first terminal 11.

SUMMARY OF THE INVENTION

Therefore, in order to address the above matters, the various features described herein have been conceived.

An object of the present invention is to provide a detailed procedure of securely issuing a rights object (RO) to a memory card, namely, an SRM, via a terminal.

Another object of the present invention is to move a RO, which has been issued to a memory card, namely, an SRM, to a different device while maintaining the RO's compatibility.

Another object of the present invention is to a mutual authentication when a plurality of memory cards or terminals are present.

Another object of the present invention is to provide a method of issuing an error-free RO in case where there are a plurality of entities, which provide the authentication, and a memory card and a terminal support different authentication entities.

To achieve these and other advantages and in accordance with the purpose of the present invention, as embodied and broadly described herein, there is provided a method of receiving, by a terminal, a rights object (RO) from a rights issuing server on behalf of a memory card, the method including, receiving, by the terminal, a trigger message for acquiring a RO from the rights issuing server, comparing, by the terminal, trust anchor and ID of the memory card in a list included in the trigger message with a trust anchor and ID of the memory card within a context of the terminal, transmitting, by the terminal, a RO request message to the rights issuing server when the trust anchor and the ID of the memory card within the context are consistent with those in the list according to the comparison result, and receiving, by the terminal, a RO response message including a protected RO from the rights issuing server.

The method may further include, prior to the comparison, confirming whether or not the trigger message includes the list including the trust anchor and the ID of the memory card. Here, if the trigger message includes the list, it may be determined that the trigger message is for the memory card.

The method may further include performing a mutual authentication procedure with the memory card by using a trust anchor, which exists in the list and is supported by the terminal, if the trust anchor and the ID of the memory card within the context are inconsistent with those in the list according to the comparison result.

The transmission of the RO request message may be performed if the trust anchor, which exists in the list and is supported by the terminal, is confirmed as being supported by the memory card through the mutual authentication procedure.

The mutual authentication procedure may include transmitting an authentication request message to the memory card, the authentication request message including information related to the trust anchor, which exists in the list and is supported by the terminal, and receiving, from the memory card, information related to whether the memory card supports the trust anchor.

The protected RO may be encrypted by using a public key of the memory card, the public key is provided from the trust anchor to be supported by the memory card.

The transmitting of the RO request message may include generating, by the terminal, the RO request message on behalf of the memory card, transmitting, by the terminal, a signature query request message including the RO request message to the memory card, receiving a signature query response message from the memory card, the signature query response message including a signature of the memory card, and transmitting the RO request message including the signature of the memory card.

The method may further include parsing the protected RO. Here, during the parsing, rights are extracted from the RO and converted into rights information as a format to be stored in the memory card.

The method may further include generating an identifier for identifying the rights information to be stored in the memory, transmitting a provisioning setup request message to the memory card, the provisioning setup request message including the identifier and information related to the size of the rights information, receiving a provisioning setup response message including a status of the provisioning setup from the memory card, and transmitting a rights provisioning request message including the rights information to the memory card to install the rights information into the memory card if the status is success.

In one aspect of the present invention, there is provided a terminal of receiving a rights object (RO) on behalf of a memory card, the terminal including, a transmission/reception unit configured to receive a trigger message for a RO acquisition from a rights issuing server, and a processor configured to control the transmission/reception unit to perform, comparing a trust anchor and ID of the memory card in a list included in the trigger message with a trust anchor and ID of the memory card within a context of the terminal, transmitting a RO request message to the rights issuing server if the trust anchor and the ID of the memory card within the context are consistent with those in the list according to the comparison result, and receiving a RO response message including a protected RO from the rights issuing server.

The present invention can render the RI to securely issue a RO to the memory card, namely, the SRM, and also render the RO stored in the SRM to be accurately used in any terminal desired by a user.

Also, the present invention can be configured to issue a RO without error when a plurality of entities providing authentication are present and the memory card and the terminal support different authentication entities.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
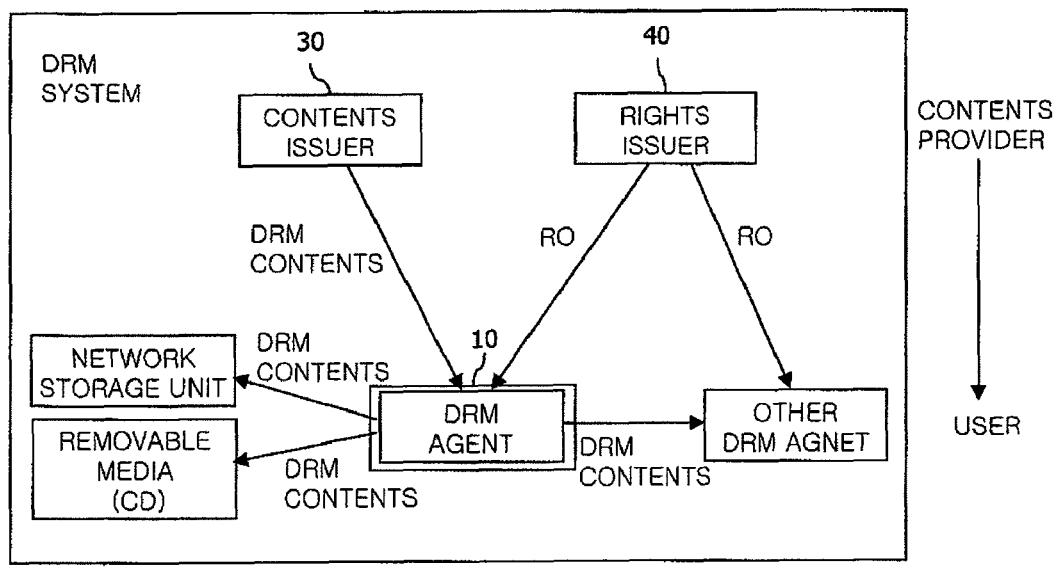
FIG. 1 illustrates the configuration of a general DRM system.
Figure 2:
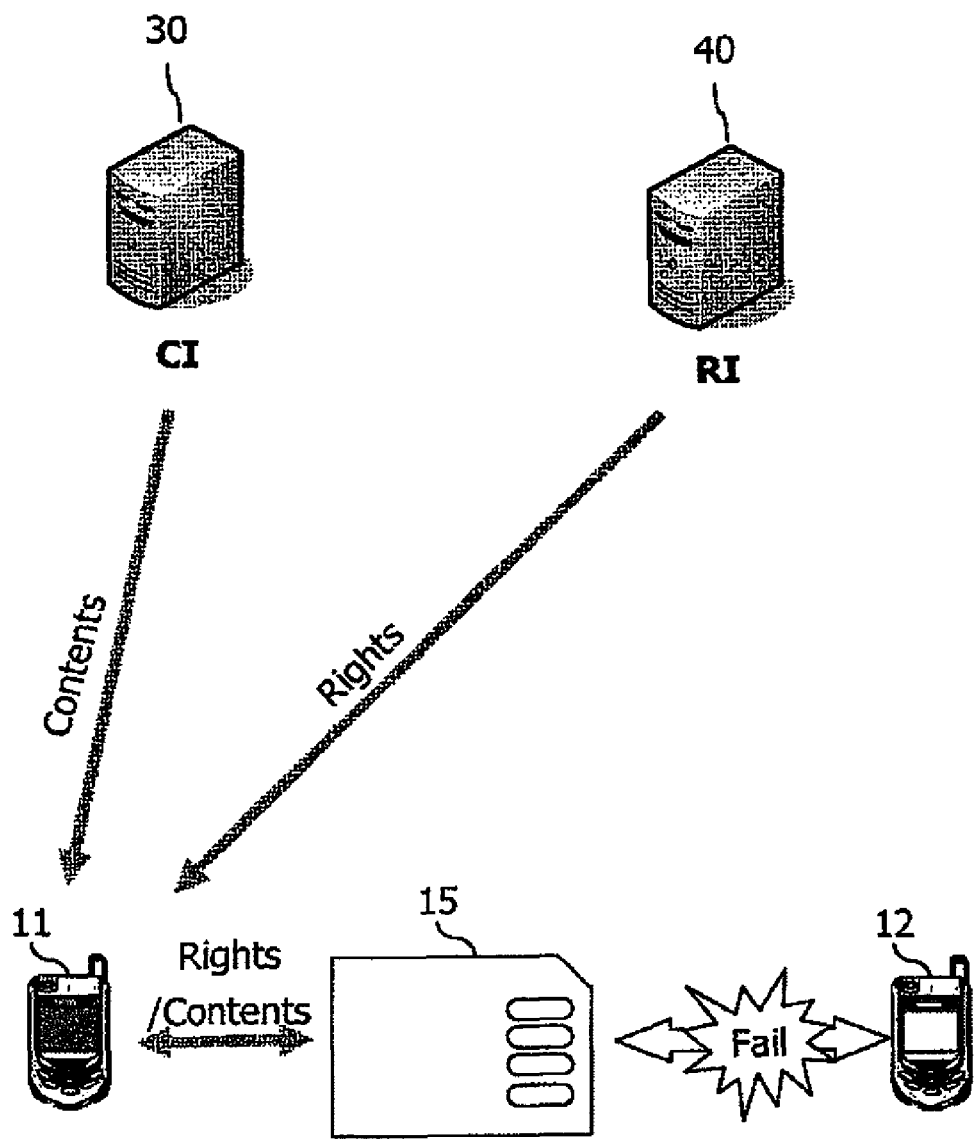
FIG. 2 illustrates problems according to the related art.

The present invention is applied for a digital rights management (DRM) system. However, without being limited thereto, the present invention can be also applicable to any other communication systems and methods and DRM-related systems and methods.

The technical terms in the description of the present invention are used for explaining particular embodiments and it should be understood that they do not limit the present invention. Unless otherwise defined, all terms used herein have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application. Also, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

The terms "a" and "an" are defined as one or more unless explicitly stated otherwise herein. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinbelow, a device is illustrated in FIGS. 3 to 7, and the device may be also called user equipment (UE), a terminal, mobile equipment (ME), or mobile station (MS). In addition, the device may be a mobile device having a communication function such as mobile phones, personal digital assistants (PDAs), smart phones, notebook computers, and the like, or may be a device that cannot be carried around such as personal computers (PCs) or a vehicle-mounted device.

DEFINITION OF TERMS

Terms used in the description of the present invention will be briefly defined to help understanding the present invention before describing the present invention with reference to the accompanying drawings.

1) DRM Agent

DRM agent is an entity existing within a terminal, to manage permissions with respect to media objects.

2) Media object

Media object denotes a digital operation (or work), for example, telephone ring-tone, screen saver, java game or an operation of their combination.

3) DRM Content

DRM content is a media object consumed depending on permission within a RO.

4) Rights Issuer (RI)

Rights Issuer (RI) is an entity for issuing a RO or rights with respect to DRM contents.

5) Permission

Permission is for an actual use of DRM contents permitted by the RI.

6) Rights

Rights denote permissions and constraints given to DRM contents. The rights are included in a RO together with associated status information and other information.

The rights comprise rights information and RO encrypted key (REK).

7) Rights Object

Rights object includes permissions (or constraints) with respect to DRM contents and other attributes connected to the contents.

The RO may be generally stored in a terminal or in a memory card, e.g., a secure removable memory (SRM), according to an exemplary embodiment of the present invention. Here, the RO may be stored in the form of RO container.

An agent of the SRM handles the RO container as an opaque object. That is, the SRM agent does not parse the RO container.

The RO may comprise rights information (including all other values excluding status information) and REK.

8) Rights Information

The rights information may include rights metadata, RO container, state information.

The rights information denotes (RO-REK)+state information=rights−REK.

9) Rights Metadata

The rights metadata may comprise a RO version, a RO alias, a RI identifier, a RI URL, a RI alias and a RI time stamp.

10) State Information

State information refers to a current state (e.g., a balance count, an interval start date) of each stateful permission within a stateful RO. If the ROs are stateful ROs, the state information is included within the rights.

11) Asset ID

Asset ID stands for an asset identifier, which is included within a RO, and used to identify DRM contents.

12) REK

REK is a RO encryption key, having a binary form, and is no base64 encoding.

13) Handle

Handle is a random number generated by a DRM agent, which is used by the DRM agent to identify rights information (or RO) stored in the memory card, e.g., the SRM. The Handle is used by the DRM agent to use or move the rights information (or RO) within the SRM, or to identify the rights information (or RO). The Handle is stored in the SRM and stored in an operation log of the terminal.

When the DRM agent transmits a message for using or moving the usage rights (or RO), the DRM agent generates the Handle and transmits the Handle to the SRM.

14) Secure Authenticated Channel (SAC)

SAC is a logical channel for guaranteeing integrity and reliability of transmitted and received messages.

15) MAKE

MAKE stands for "Mutual Authentication And Key Exchange." SAC context required for setting the SAC can be generated through the MAKE procedure.

In detail, DRM agents may mutually negotiate a trust mode, an entity ID, a security algorithm and the like, and authenticate each other, through the MAKE procedure. Also, information relating to an encryption key (e.g., session key, MAC key) to be used in SAC is exchanged through the MAKE procedure. The MAKE procedure will be explained in detail with reference to FIG. 5.

16) Trust Anchor (also, Referred to as "TA")

Trust Anchor denotes a particular device existing within a DRM system or an entity or device which ensures integrity and reliability of specific information. When several entities reliable to each other exist in the form of chains, the uppermost entity is the trust anchor. A public key of the trust anchor is used to verify data relating to a digital signature.

A user who relies on the trust anchor can verify a digital signature included in a particular object by using a public key issued by the trust anchor, thus to confirm whether the digital signature is available.

17) SAC Context

SAC context may include information required for SAC setup as shown in Table 1 as follows. The SAC context is maintained until before a new SAC is generated between a DRM agent and an SRM agent.

TABLE 1

| Name | Description |
|---|---|
| MAC Key | Key used to guarantee integrity in SAC session between DRM agent and SRM agent. |
| Session Key | Encryption key used to assure confidentiality in SAC session between DRM agent and SRM agent. |
| Selected Algorithms | Algorithms negotiated through MAKE |
| Trust Anchor | Trust anchor set at SAC |
| Entity ID | SRM ID is indicated for DRM agent, while DRM ID is indicated for SRM agent. |

17) Protected RO

The protected RO is a format according to DRM Version 2.0. The protected RO is a format used when the protected RO is provided from the RI to the terminal. In addition, the protected RO is a format used when the protected RO is transferred from the DRM agent of the terminal to the memory card, e.g., the SRM agent of the SRM.

The protected RO includes elements as shown below, namely, including a <RO> element and a <mac> element including a MAC value. The <mac> element is used to confirm integrity and a key of the <RO> element.

TABLE 2

```
<element name="protectedRO" type="roap:ProtectedRO"
form="qualified"/>
<complexType name="ProtectedRO">
    <sequence>
        <element name="ro" type="roap:ROPayload"
        form="qualified"/>
        <element name="mac" type="ds:SignatureType"/>
    </sequence>
</complexType>
```

As shown in Table 1, <ro> element includes an identifier for identifying ROPayload item. The ROPayload item includes protected rights and wrapped keys. The wrapped keys are used to decrypt a coded (encrypted) portion of the rights. The ROPayload item includes contents shown in Table 3 below:

TABLE 3

```
<!-- Rights Object Definitions -->
<complexType name="ROPayload">
    <sequence>
        <element name="riID" type="roap:Identifier"/>
        <element name="rights" type="o-ex:rightsType"/>
        <element name="signature" type="ds:SignatureType"
        minOccurs="0"/>
        <element name="timeStamp" type="dateTime"
        minOccurs="0"/>
        <element name="encKey" type="xenc:EncryptedKeyType"/>
        <element ref="roap:roPayloadAliases" minOccurs="0"/>
        <any processContents="lax" minOccurs="0"
        maxOccurs="unbounded"/>
    </sequence>
    <attribute name="version" type="roap:Version"
    use="required" />
    <attribute name="id" type="ID" use="required" />
    <attribute name="stateful" type="boolean"/>
    <attribute name="domainRO" type="boolean"/>
    <attribute name="riURL" type="anyURI"/>
</complexType>
```

An <riID> element includes an identifier for identifying an RI.

A <timestamp> value is given by a universal coordinated time (UTC) and used to prevent hacking or cranking through retransmission.

A <Signature> element includes the signature of the RI.

An <encKey> element includes wrapped MAC key ($K_{MAC}$), REK (RO encryption key), $K_{REK}$.

In the meantime, a <roPayloadAliases> element, shown in Table 4 below, is included in the ROPayload.

TABLE 4

```
<element name="roPayloadAliases">
    <complexType>
        <sequence>
            <element name="roAlias"
            type="roap:String80" minOccurs="0"/>
            <element name="domainAlias"
            type="roap:String80" minOccurs="0"/>
            <element name="riAlias"
            type="roap:String80"/>
            <any processContents="lax" minOccurs="0"
            maxOccurs="unbounded"/>
        </sequence>
    </complexType>
</element>
```

Meanwhile, a Nonce item includes a certain value in a rights object acquisition protocol (ROAP) protocol message. The Nonce item must be used only once. That is, a certain value of the Nonce is generated whenever the ROAP message is generated.

```
<simpleType name="Nonce">
    <restriction base="base64Binary">
        <minLength value="14"/>
    </restriction>
</simpleType>
```

Description of Concept of Method Proposed in this Specification

The present invention provides a method capable of accurately recognizing SRM-ID under the same trust model among RI, DRM agent and SRM agent, by matching a trust model supported by the RI with a trust model negotiated between the DRM agent and the SRM agent for a secure authenticated channel (SAC) session. The match is performed based upon information included in a new trigger message, which is extended from ROAP trigger defined in the conventional DRM v2.1. Also, the present invention extends the ROAP trigger message at a ROAP interface between the RI and the DRM agent, and newly defines a protocol for direct provisioning of rights to the SRM procedure at an interface between the DRM agent and SRM 1.1.

The SRM can support many trust models. Accordingly, in order to enable the RI, the DRM agent and the SRM agent to perform encryption and decryption and recognize an entity ID under the same trust model, the trust model negotiated between the DRM agent and the SRM agent for a SAC session should match with the trust model supported by the RI.

Also, the DRM agent receives the ROAP triggermessage from the RI and the same trust model is set between the RI and the SRM, thereby accurately recognizing (identifying) an SRM mounted in a device. Accordingly, direct provisioning of rights to the SRM procedure can be conducted without any error.

Hereinafter, exemplary embodiments of the present invention will be described in detail with reference to the accompanying drawings.

Figure 3:
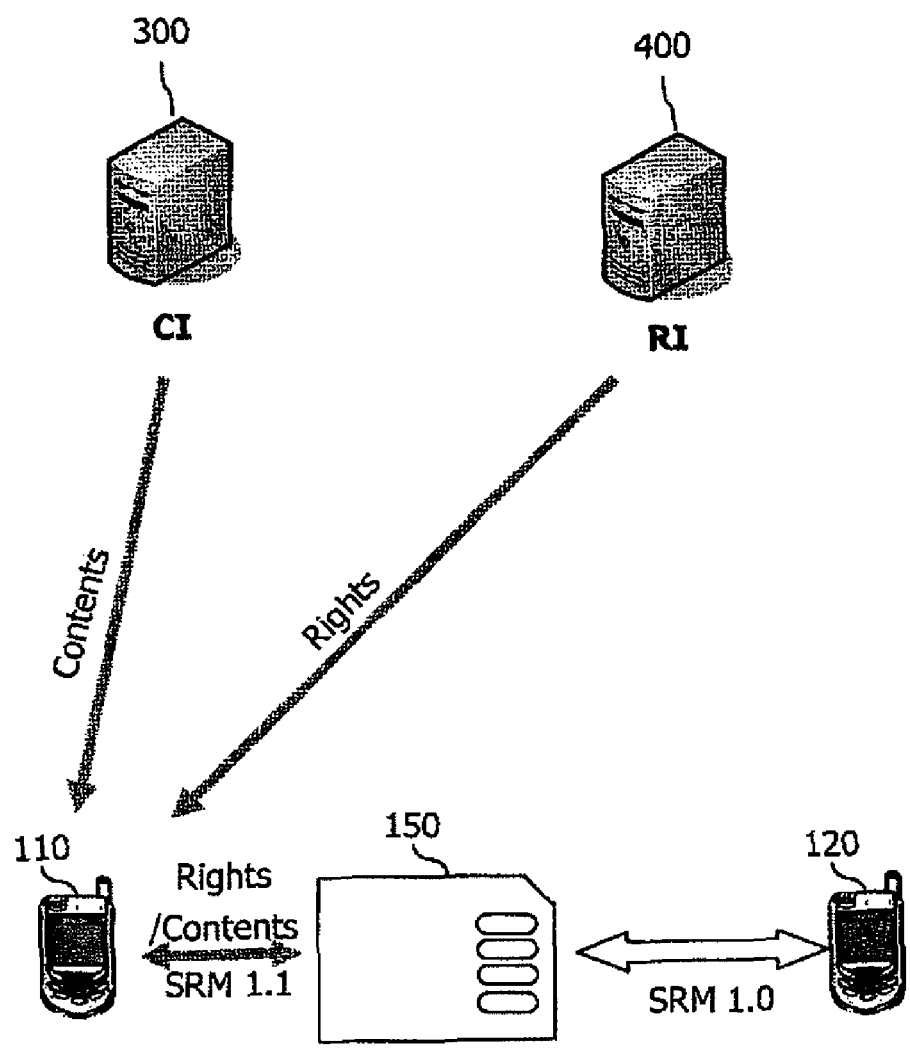
FIG. 3 illustrates the concept for issuing contents and RO to a memory card according to an exemplary embodiment of the present invention.

FIG. 3 illustrates the concept for issuing contents and RO to a memory card according to an exemplary embodiment of the present invention.

As shown in FIG. 3, a contents issuer (CI) 300 issues contents to a memory card, namely, to an SRM 150, via a first terminal 100. An RI 400 issues a RO with respect to the contents to the memory card, namely, to the SRM 150, via the first terminal 110. In this case, the RO is issued in the name of the memory card, namely, the SRM 150. The first and second terminals 110 and 120 (referred to as reference numeral 100, hereinafter) include a DRM agent, respectively. The SRM 150 includes an SRM agent.

Accordingly, when a user of the first terminal 110 transfers (or hands over) the memory card, namely, the SRM 150, to the second terminal 120, the second terminal 120 may use the contents with authorization.

Herein, a new protocol is defined between the DRM agent of the first terminal 110 and the SRM agent of the SRM 150 according to an exemplary embodiment of the present invention. Namely, a signature query protocol required for issuing a RO in the name of the SRM agent, a provisioning setup protocol for providing the RO issued in the name of the SRM from the DRM agent to the SRM agent, and a rights provisioning protocol are proposed between the DRM agent of the first terminal 110 and the SRM agent of the SRM 150.

The exemplary embodiments of the present invention will now be described with reference to FIGS. 4 to 8.

Figure 4:
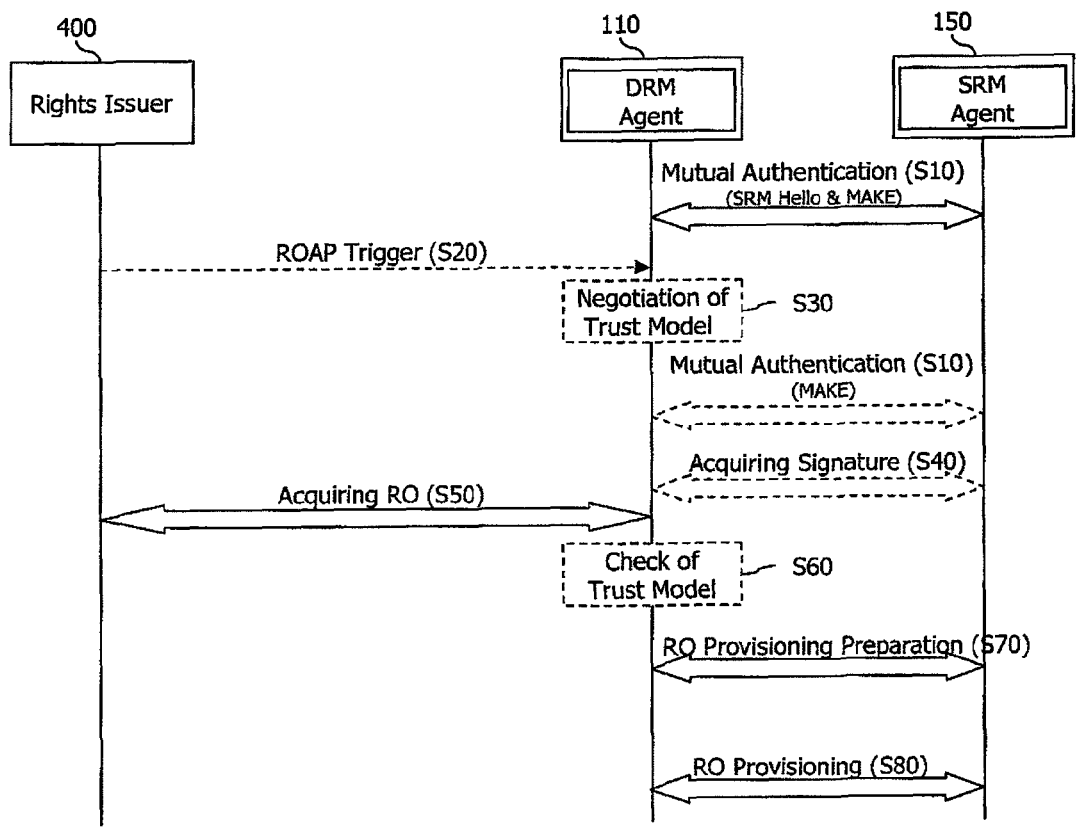
FIG. 4 is a flowchart schematically illustrating the concept of the present invention.

FIG. 4 is a flow chart schematically illustrating a method according to a first exemplary embodiment of the present invention.

The present invention may include HELLO and MAKE procedures between a DRM agent and an SRM agent (S10), a trust model negotiation process (S30 or S60), a RO acquisition process (S50), a preparation process performed by the DRM agent to transfer a RO issued from a RI 400 (S70), and a process of providing the RO to the SRM agent (S80).

The HELLO and MAKE procedures (S10) may start when a SRM is mounted in a terminal. The DRM agent and the SRM agent recognize and authenticate each other through the HELLO and MAKE procedures (S10), to thereafter negotiate a trust model, an entity ID, a security algorithm and the like.

The trust model negotiation process (S30 or S60) is to negotiate a trust anchor with the RI 400 when having received a trigger message from the RI 400 (S20) or when having acquired a RO (S50). Here, if the trust anchor negotiated through the trust model negotiation process (S30 or S60) is different from a trust anchor, which has been negotiated between the DRM agent and the SRM agent through the HELLO and MAKE procedures (S10), the HELLO and MAKE procedures may be executed once more (S10').

During the RO acquisition process (S50), when the RI 400 issues a RO in the name of the SRM, the RO is provided to the DRM agent as a protected RO, so that important information e.g., information such as REK, CEK and the like, within the RO, cannot be leaked to the terminal 100 or to the exterior.

Through the RO preparation process (S70), the DRM agent may provide the SRM agent with Handle used to discriminate rights to be installed into the SRM and encrypted information for preparation of installation.

After completion of the RO provisioning preparation, the DRM agent provides the RO to the SRM agent (S80).

Figure 5:
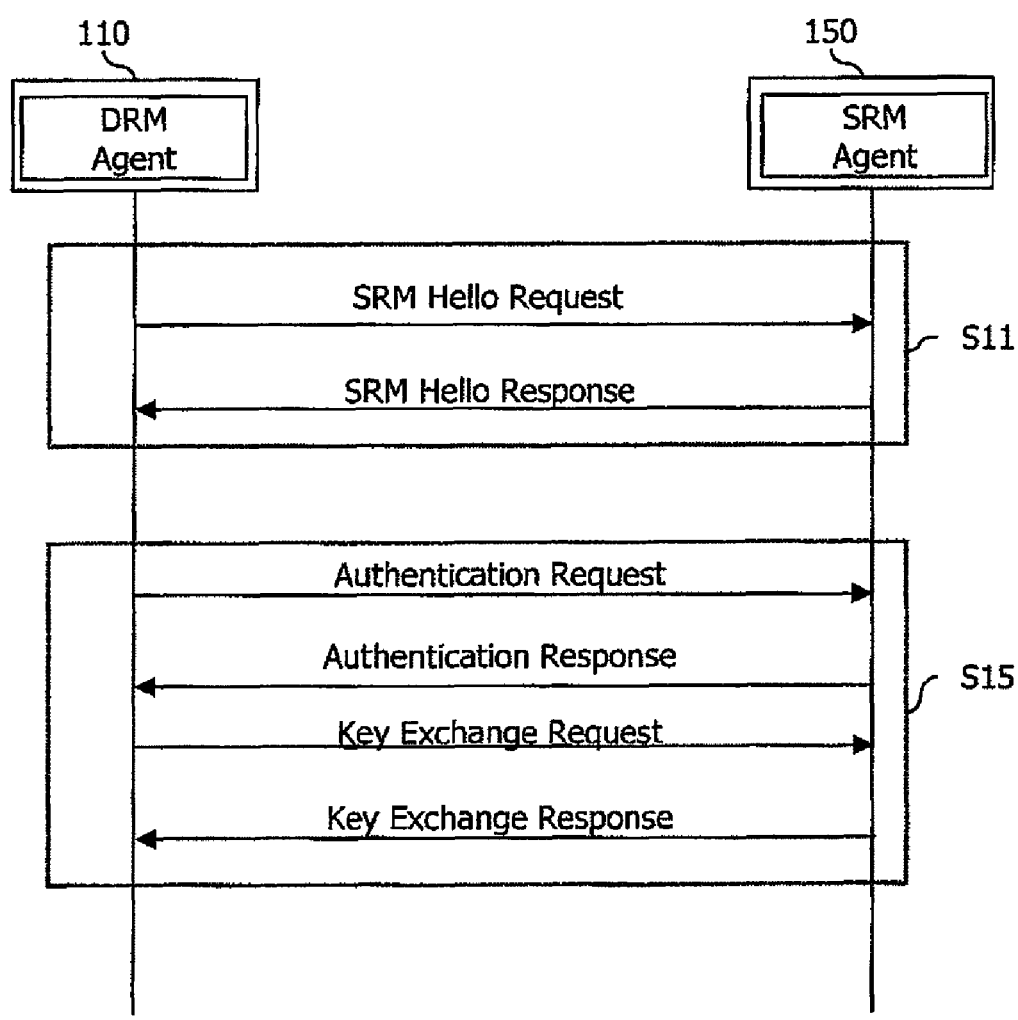
FIG. 5 is a flowchart illustrating in detail a mutual authentication (HELLO and Make) process of FIG. 4.

FIG. 5 is a flowchart illustrating in detail a mutual authentication (HELLO and Make) process of FIG. 4.

As shown in FIG. 5, the mutual recognition and authentication process includes a HELLO procedure (S11) and a MAKE procedure (S15).

Hereinafter, the HELLO procedure (S11) will be described.

The DRM agent transmits to the SRM agent an SRM Hello Request message including SRM version information supported thereby and a list containing information on a pair of the trust anchor and a terminal (device) ID.

Upon receiving the SRM Hello Request message, the SRM agent compares the SRM version information included in the message with its own version, and selects an appropriate version. The SRM agent then transmits an SRM Hello Response message to the DRM agent. Here, the SRM Hello Response message includes a list containing information relating to a pair of a trust anchor supported by the SRM agent and an SRM ID. In addition, the SRM Hello Response message may include a list of terminal IDs of which certificate information have completely been verified by the SRM agent. The SRM Hello Response message may further include information relating to a maximum number of Hs (Asset IDs) supported by the SRM agent and information relating to whether additional messages can be supported.

The information relating to whether additional messages can be supported may be included in the SRM Hello Response message in the format as follows.

TABLE 5

| Parameter | Description |
| --- | --- |
| ocspSupported | If '0', OCSP Nonce and OCSP Process messages are not supported by SRM agent. If '1', OCSP Nonce and OCSP Process messages are supported by SRM agent. |
| rightsInfoListSupported | If '0', Rights Info List Query message is not supported by SRM agent. If '1', Rights Info List Query message is supported by SRM agent. |
| riCertificateStorageSupported | If '0', RI Certificate Store and RI Certificate Query messages are not supported by SRM agent. If '1', RI Certificate Store and RI Certificate Query messages are supported by SRM agent. |
| riCertificateRemovalSupported | If '0', RI Certificate Removal message is not supported by SRM agent. If '1', RI Certificate Removal message is supported by SRM agent. |
| dynamicCodePageSupported | If '0', Dynamic Code Page Query and Dynamic Code Page Update messages are not supported by SRM agent. If '1', Dynamic Code Page Query and Dynamic Code Page Update messages are supported by SRM agent. |
| changeSacSupported | If '0', ChangeSac message is not supported by SRM agent. If '1', ChangeSac message is supported by SRM agent. |

Hereinafter, the MAKE procedure (S15) will be described.

The DRM agent selects a trust anchor supported by the DRM agent from a list of trust anchors supported by the SRM agent, and transmits an Authentication Request message to the SRM agent. The Authentication Request message may include certificate chains of the terminal 100, an SRM ID (Peer Key ID) for which certification information has completely been verified, and encryption algorithm information (e.g., hash algorithm, MAC algorithm, signature algorithm, public key encryption algorithm, symmetric cipher algorithm and key derivation algorithm).

Upon receiving the Authentication Request message, the SRM agent confirms the trust anchor selected by the DRM agent. If the Authentication Request message includes a certificate of the DRM agent, the SRM agent stores the certificate of the DRM agent. The SRM agent then selects an algorithm supported by itself from information relating to algorithms within the Authentication Request message. The SRM agent then generates a random value ($RN_S$, Random Number from SRM) for key information to be used at the SAC.

The SRM agent transmits an Authentication Response message to the DRM agent. The Authentication Response message may include the certificate of the SRM. However, if the received Authentication Request message includes Peer Key ID, the certificate of the SRM may not be included in the Authentication Response message. The Authentication Response message may also include information on the generated random value $RN_S$, version, the selected algorithm and supportable algorithm. Such information may be included in an encrypted state by use of a public key of the DRM agent. Also, the Authentication Response message may further include the processing results (Status) of the received Authentication Request message.

Upon receiving the Authentication Response message, the DRM agent decrypts (decodes) the information within the Authentication Response message by using its private key, and confirms the decrypted information. The DRM agent then generates a random value ($RN_D$, Random Number from Device) for key information to be used at the SAC.

The DRM agent transmits a Key Exchange Request message to the SRM agent. The Key Exchange Request message may include information relating to the generated random value $RN_D$, a selected version and the like. The information may be included in an encrypted state by use of the public key of the SRM agent.

Upon receiving the Key Exchange Request message, the SRM agent decodes the information within the message by use of its private key. The SRM agent then confirms the random value $RN_D$ and then ascertains information used to derive a MAC key and a session key to be used at the SAC. In order to derive the MAC key and the session key, there are needed information related to KDF (Key Derivation Function), $Z=RN_D|RNS$, otherinfo=Supported Algorithms|Selected Algorithms, and kLen (36 bytes).

In addition, the SRM agent compares the random value $RN_S$, which was generated by the SRM agent itself and transmitted to the DRM agent, with a hash value of the received random value $RN_D$, to confirm whether the random value has successfully been transmitted and whether the DRM agent is a sufficiently reliable entity.

Afterwards, the SRM agent transmits a Key Exchange Response message to the DRM agent. The Key Exchange Response message may include processing results (Status) of the received Key Exchange Request message and a hash value (i.e., Hash ($RN_D|RN_S$) value) of the random value $RN_S$ of the SRM agent and the random value $RN_D$ of the DRM agent.

Upon receiving the Key Exchange Response message, the DRM agent confirms the processing results of the SRM agent with respect to the Key Exchange Request message. The DRM agent then compares the hash value, namely, Hash ($RN_D|RN_S$) value, with respect to the random value $RN_S$ of the SRM agent and the random value $RN_D$ of the DRM agent, with a previously transmitted random value $RN_D$ of the DRM agent and a previously received random value $RN_S$ of the SRM agent, thereby confirming whether the random values are correct.

After completion of the MAKE procedure, a SAC context including information for SAC setup is generated within the DRM agent and the SRM agent, respectively. The SAC context may include information as shown in Table 1.

Figure 6:
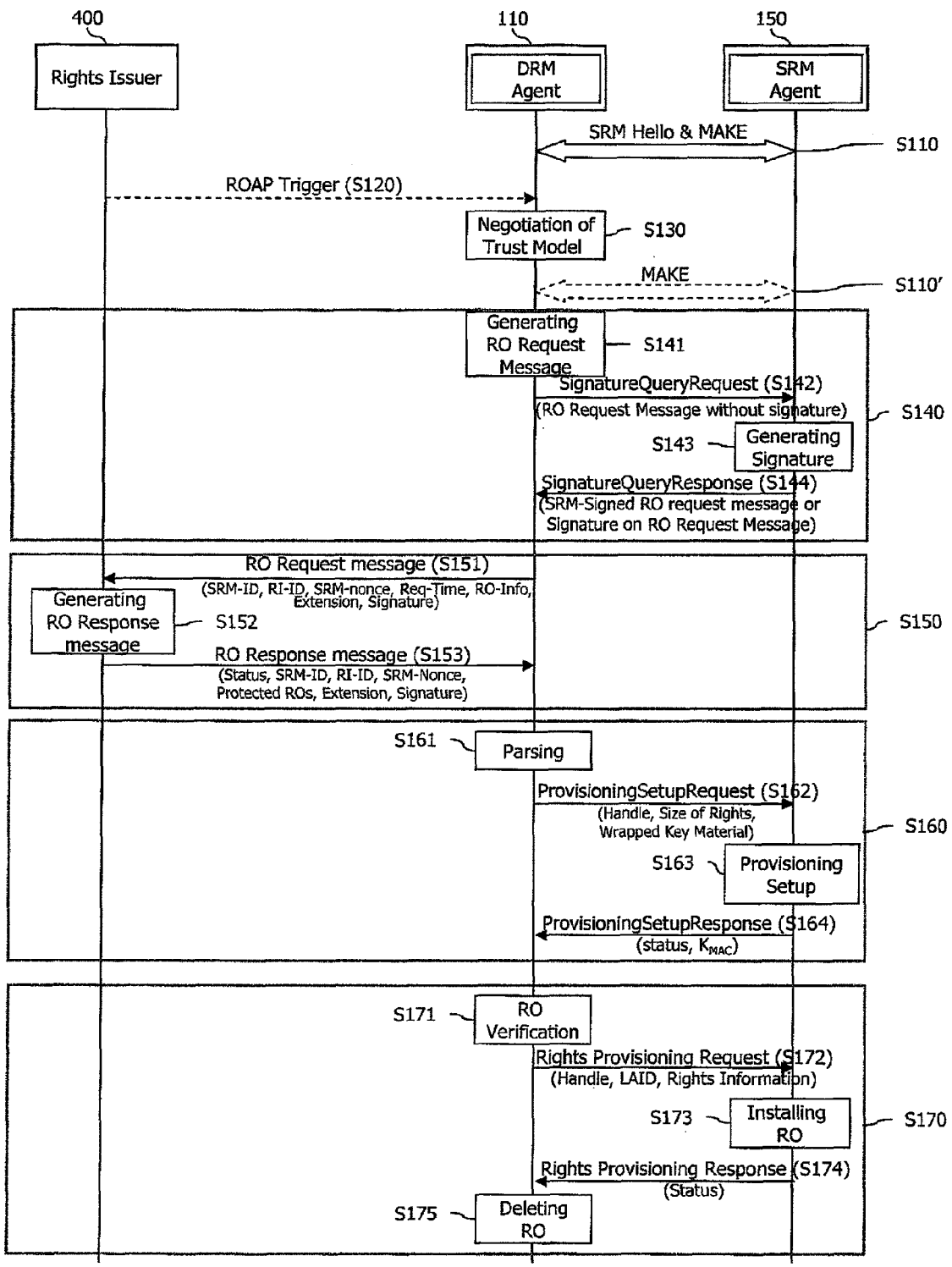
FIG. 6 is a flowchart illustrating a method according to a first exemplary embodiment of the present invention.

FIG. 6 is a flowchart illustrating a method according to a first exemplary embodiment of the present invention.

As shown in FIG. 6, in the method according to the first embodiment, when the RI 400 desires to issue a RO (or rights) to the SRM 150 via the terminal 100, the RI 400 confirms the signature of the SRM 150 so as to authenticate the SRM. Also, according to the first embodiment of the present invention, when the RI 400 issues a RO (or rights) in the name of the SRM, it provides the RO (or rights) to the terminal 100 in the form of a protected RO, thereby preventing important information within the RO, e.g., REK, CEK and the like, from being leaked to the terminal 100 or to the outside.

A detailed description is followed.

1) First, the DRM agent and the SRM agent perform the SRM Hello and MAKE procedures for a mutual recognition and authentication (S110).

In detail, as stated above, the DRM agent and the SRM agent negotiate, through the SRM Hello Request message and Response message, a supportable version, a list of a trust anchor and ID pair, Key ID list of the SRM, Max Number Of AssetIDs, whether additional messages are supportable, and the like.

2) Afterwards, the RI 400 transmits a trigger message, e.g., a Trigger message for acquiring a RO (or rights), or a rights object acquisition message (ROAP) Trigger message to the terminal 100 in which the SRM is mounted, so as to provide a RO (or rights) in the name of the SRM (S120). The Trigger message may be transmitted when the RI 400 requests for transfer of a RO (or rights) with respect to particular contents in a manner of, for example, a web browsing, from a user of the SRM 100. Upon the transfer request, information related to the SRM 150, for example, SRM ID and IMSI, and information related to the SRM-mounted terminal 100, for example, Device ID, are transferred to the RI 400.

The trigger message may be in the format as follows.

TABLE 6

```
<complexType name="ExtendedROAcquisitionTrigger">
    <complexContent>
        <extension base="roap: BasicRoapTrigger">
            <sequence>
                <element name="domainID" type="roap:DomainIdentifier" minOccurs="0"/>
                <element name="domainAlias" type="string" minOccurs="0"/>
                <sequence maxOccurs="unbounded">
                <element name="roID" type="ID"/>
                <element name="roAlias" type="roap:String80" minOccurs="0"/>
                <element name="contentID" type="anyURI" minOccurs="0" maxOccurs="unbounded"/>
                <element name="trustAnchorAndsrmIDPair" type="roap:trustAnchorAnd
```

TABLE 6-continued

```
srmIdentifierPairType" minOccurs="0" maxOccurs="unbounded">
          </sequence>
      </sequence>
          </extension>
      </complexContent>
</complexType>
<complexType name="trustAnchorAndsrmIdentifierPairType">
    <sequence>
        <element name="trustAnchor" type="roap:Identifier"/>
        <element name="srmID" type="roap:Identifier"/>
    </sequence>
</complexType>
```

The <trustAnchorAndsrmIDPair> element includes a pair of trustAnchor element and srmID element.

The <trustAnchorAndsrmIDPair> element includes information allowing for discrimination of a RO-installed SRM.

In the meantime, upon receiving the transfer request, the RI 400 may also generate a RO (or rights) with respect to the particular content. Alternatively, the generation of RO (or rights) may be executed after a RO Request message is received from the terminal 100.

3) When receiving the trigger message, the DRM agent determines whether the ROAP message is for the DRM agent itself or for the SRM 150.

Afterwards, the DRM agent negotiates a trust model (S130). The DRM agent may optionally execute the SRM Hello procedure and the MAKE procedure. Those procedures will be explained later with reference to FIG. 7.

4) The DRM agent then acquires a signature of the SRM before requesting a RO from the RI (S140), which will be described in detail as follows.

The DRM agent of the terminal 100 generates a RO Request message for requesting a RO (or rights) from the RI 400 on behalf of the SRM 150 (S141).

Here, when generating the RO Request message, the DRM agent generates the message excluding a portion of a signature or the message including an empty space for the signature. The RO Request message may include the SRM ID other than the terminal ID. The RO Request message may also include an ID of the RI, Device Nonce, Request time, RO information and Extension parameter. The Extension parameter may include information related to the negotiated trust anchor (the trust anchor stored in the SAC context). The RI is able to know the trust anchor of the SRM and the SRM-ID based upon the trust anchor included in the Extension, and to perform RSA-encryption to match the corresponding trust anchor, and generate the protected RO for the SRM.

The DRM agent transmits the generated RO Request message to the SRM agent to request a signature (S142). The signature request may be achieved by transmission, for example, of a Signature Query Request message or a Singing Request message. The Signature Query Request message or the Singing Request message may include the RO Request message without the signature. The Signature Query Request message may include items shown in Table 7 below:

TABLE 7

| Fields | Description |
| --- | --- |
| RO Request | RO Request message |
| Signature Scheme | Signature scheme negotiated between RI 400 and terminal |

Meanwhile, the RO Request message included in the Signature Query Request message or the Singing Request message needs to have integrity. To this end, the RO Request message includes a HMAC value. The HMAC value guarantees that the RO Request message has not been changed while having been transmitted from the DRM agent to the SRM agent. The HMAC value is generated by using a HMAC algorithm negotiated between the DRM agent and the SRM agent. The HMAC algorithm uses HMAC-SHA1-128.

Upon receiving the Signature Query Request message or the Singing Request message, the DRM agent performs an integrity verification on the RO Request message and thereafter transmits a Signature Query Response message or a Signing Response message to the DRM agent (S144). The Signature Query Response message or the Signing Response message includes the RO Request message with the signature. That is, the SRM agent includes its signature in the RO Request message, implying that the SRM agent itself requests a RO from the RI 400, and then encapsulates the RO Request message including the signature in the Signature Query Response message or the Signing Response message for transmission. Alternatively, the Signature Query Response message or the Signing Response message may include only the signature.

The Signature Query Response message includes items as shown in Table 8 below:

TABLE 8

| Fields | Description |
| --- | --- |
| Status | This status field may be included only when processing results of the Signature Query Request message have an error |
| Signature of RO Request | Digital signature value of SRM with respect to RO Request message generated by use of the SRM private key. |

The Status field may include values listed in Table 9 below:

TABLE 9

| Status Value | |
| --- | --- |
| Success | Status is successful. |
| Signature Scheme Not Supported | Signature scheme is not supported by SRM agent. |
| Parameter Failed | Field length or format is inaccurate |
| Unexpected Request | Received out of turn or not allowed |
| Unknown Error | Other error |

The RO Request message including the signature or the digital signature needs to have integrity. To this end, the RO Request message or the digital signature includes a HMAC value. The HMAC value guarantees that the RO Request message or the digital signature has not been changed while having been transmitted. The HMAC value is generated by using a HMAC algorithm negotiated between the DRM agent and the SRM agent. The HMAC algorithm uses HMAC-SHA1-128.

5) Upon receiving the Signature Query Response message or the Signing Response message from the SRM agent, the DRM agent performs RO acquisition processes (S150), which will be explained in detail as follows.

The DRM agent transmits the RO Request message including the signature of the SRM to the RI 400 (S151).

The RI 400 generates a RO response message, for example, RO Response message (S152). The RI 400 then confirms a trust anchor for the SRM based upon information related to the trust anchor included in the Extension parameter of the RO Request message.

Afterwards, the RI 400 transmits the RO Response message to the DRM agent (S153). Here, the RI 400 may include a previously generated or currently generated RO in the form of a protected RO in the RO Response message. Here, when the RI 400 generates a protected RO for the SRM, the RI 400 encodes K_MAC and K_REK by using a public key of the SRM 150 complying with the confirmed trust anchor of the SRM.

The RO Response message includes the signature of the RI 400. The RO Request message and the RO Response message follow a protocol of DRM 2.0 or a protocol of DRM 2.1.

6) Upon receiving the RO Response message, the DRM agent performs the RO provisioning preparation processes (160), which will be described in detail as follows.

The DRM agent verifies the received RO Response message and parses the received RO Response message (S161). That is, the DRM agent verifies the signature included in the RO Response message so as to confirm that the RO Response message has been generated by the RI 400 and not changed during transmission. The DRM agent decodes the protected RO through the parsing. This will now be described in detail as follows.

First, the DRM agent extracts rights to be installed in the SRM 150 from the RO Response message and converts the extracted rights into rights information, namely, a format to be stored in the SRM 150. The rights information includes rights metadata and RO container and state information as shown in Table 10.

TABLE 10

Rights Meta Data

① Rights Object Version: <protectedRO> element::<ro> element::<version> element.
② RO Alias: <protectedRO> element::<ro> element::<roPayloadAliases>::<roAlias> element.
③ RI Identifier: <protectedRO> element::<ro> element::<riID> element.
④ RI URL: <protectedRO> element::<ro> element::<riURL> element.
⑤ RI Alias: <protectedRO> element::<ro> element::<roPayloadAliases> element::<riAlias> element.
⑥ RI Time Stamp: <protectedRO> element::<ro> element::<timeStamp> element.
Rights Object Container ① <rights> element: <protectedRO> element::<ro> element:::<rights> element.
② <signature> element: <protected RO> element::<ro> element::<signature> element.
State Information If the RO is a stateful RO, the DRM agent generates state information for rights to be installed into the SRM agent. In this case, the state information is filled such that RO, which has been issued by the RI 400 to the SRM, remains non-used.

Subsequently, the DRM agent measures the size of the generated rights information.

And then, the DRM agent extracts a wrapped key material from the protected RO within the RO Response message. The wrapped key material may be encrypted by using a public key of the SRM agent. The DRM agent transfers a Rights Provisioning Setup message including the wrapped key material to the SRM agent because the DRM agent cannot decrypt the wrapped key material which is encrypted by using the public key of the SRM agent. The wrapped key material is included in a <protectedRO> element:: a <ro> element:: a <enKey> element:: a <xenc:CipherData> element:: <xenc:Ciphervalue> element. Here, the symbol '::' indicates one or more sub elements. In other words, the <protectedRO> element includes the <ro> element, and the <ro> element includes the <encKey> element.

Afterwards, the DRM agent randomly generates a Handle to identify rights to be installed in the SRM.

After completion of the parsing (S161), the DRM agent generates a provisioning setup request message, namely, a Provisioning Setup Request message, and transmits the same to the SRM agent (S162). The Provisioning Setup Request message includes the Handle, size and the wrapped key material. In detail, the Provisioning Setup Request message includes fields as shown in Table 11 below:

TABLE 11

| Fields | Description |
| --- | --- |
| Handle | The Handle is used to identify rights stored in the SRM. The Handle has 10 bytes, which is randomly generated by the DRM agent. Particular rights may be selected from rights stored in the SRM through the Handle so as to use contents. The Handle is included in an encrypted state. |
| Size | The size of the rights, indicating the size of rights information to be stored in the SRM agent. The rights information includes rights metadata, RO container and state information. |
| Wrapped key material | Wrapped key material includes MAC key, $K_{MAC}$, REK, and $K_{REK}$. Wrapped key material has the same value as C value included in the RO Response message. The C value corresponds to <protectedRO> element:: <ro> element :: <encKey> element:: <xenc:CipherData> element :: <xenc:Ciphervalue> element. |

The SRM agent receives Provisioning Setup Request message from the DRM agent and performs a provisioning setup procedure (S163).

In detail, the SRM agent decodes (decrypts) the wrapped key material and acquires the values $K_{MAC}|K_{REK}$ by decoding the AES-WRAP (KEK, $K_{MAC}|K_{REK}$) with a private key of the SRM agent.

The SRM Agent splits the C value into $C_1$ and $C_2$ and acquires value $c_1$ by using the $C_1$ value through an Octet-String-to-Integer primitive OS2IP( ) And the SRM Agent decodes (or decrypts) the $c_1$ value by using the private key of the SRM to acquire Z value.

$$C_1|C_2=C$$

$$c_1=\text{OS2IP}(C_1, m\text{Len})$$

$$Z=RSA.\text{DECRYPT}(\text{PrivKeySRM}, c1) = c1^d \bmod m \quad \text{[Equation 1]}$$

where OS2IP( ) is a function of converting octet string into nonnegative integer, and defined in [PKCS-1].

The SRM agent inputs the Z value to Equation 2 below so as to derive KEK.

$$KEK=KDF(\text{I2OSP}(Z,m\text{Len}),\text{NULL},kek\text{Len}) \quad \text{[Equation 2]}$$

The SRM agent inputs KEK and C2 to AES-UNWRAP( ) of Equation 2 below to acquire $K_{MAC}|K_{REK}$.

$$K_{MAC}|K_{REK}=\text{AES-UNWRAP}(KEK,C_2) \quad \text{[Equation 3]}$$

$K_{MAC}$ and $K_{REK}$ values are decoded by using the private key of the SRM agent to be identified. The SRM agent stores the $K_{REK}$ (REK) from the decrypted $K_{MAC}$ and $K_{REK}$. The REK is used to decode an encrypted CEK transferred via a <rights> element of the RO container included in a rights provisioning request message, e.g., Rights Provisioning Request, which is scheduled to be received from the DRM agent.

After completion of the provisioning setup procedure, the SRM agent reserves a region in a memory for the Handle included in the provisioning setup request message, e.g., the Provisioning Setup Request, which has been received from the DRM agent, in the SRM, and transmits a provisioning setup response message to the DRM agent (S164). Here, the SRM stores only the Handle and the REK, and the region for rights information and LAID is merely reserved. When the rights provisioning request message, e.g., Rights Provisioning Request, is actually received later from the DRM agent, the Handle and the REK are stored together with the rights information included in the Rights Provisioning Request message.

The Provisioning Setup Response message includes fields as shown in Table 12 below:

TABLE 12

| Fields | Description |
| --- | --- |
| Status | The values of status according to processing results of provisioning setup request message are as shown in Table 13 below |
| $K_{MAC}$ | MAC key for verifying integrity of rights issued by the RI 400 to the SRM |

In this case, if the SRM agent successfully completes the preparation for setting up the provisioning, the SRM agent includes a value indicating 'Success' in the status field. Also, the SRM agent includes the $K_{MAC}$ value in the $K_{MAC}$ field. Through the received $K_{MAC}$, integrity of the protected RO can be confirmed.

If the SRM agent fails the preparation for setting up the provisioning, the SRM agent includes a corresponding error, as shown in Table 13 below, in the status field and transfers the same.

TABLE 13

| Status values | Description |
| --- | --- |
| Success | Provision setup request has been successfully processed. |
| Field integrity verification failed | HMAC value of provisioning setup request message is inconsistent with HMAC value generated by the SRM agent. |
| Duplicate handle | The SRM already has the same rights related to the Handle. |
| Not enough space | There is no extra storage space corresponding to Size of Rights in the SRM |
| Parameter failed | There is a problem in the structure or length of the provisioning setup request message |

TABLE 13-continued

| Status values | Description |
| --- | --- |
| Unexpected request | Provisioning setup request has been received in an erroneous order or Provisioning setup request was a message not allowed |
| Unknown error | Unknown error has occurred |

7) When the DRM agent receives the Provisioning Setup Response message, the DRM agent performs a RO provisioning procedure (S170), which will be described in detail as follows.

First, the DRM agent verifies the RO (S171). In detail, the DRM agent verifies that the protected RO has not been changed while the DRM agent has received the same from the RI 400 through the $K_{MAC}$ included in the provisioning Setup Response message. Through the verification process, the DRM agent ascertains that the <rights> element, $K_{MAC}|K_{REK}$, included in the <ro> element in the protected RO has been properly transferred. The DRM agent performs the verification operation on the protected RO on behalf of the SRM agent, and if the corresponding verification result is proper, the DRM agent performs rights provisioning procedure.

In order to perform the rights provisioning procedure, the DRM agent transmits, for example, a Rights Provisioning Request message to the SRM agent (S172).

The Rights Provisioning Setup Request message includes a Handle that has been reserved in the SRM by transmitting the Provisioning Setup Request message. The Handle may be encrypted. In addition, the Rights Provisioning Setup Request message includes a list of asset ID (LAID) and rights information. Here, the DRM agent changes or converts the RO that has been transferred from the RI 400 into a format that can be recognized by the SRM agent and includes the LAID and the rights information in the message. The format that can be recognized by the SRM agent may be an SRM 1.0 format.

The Rights Provisioning Setup Request message may include fields as shown in Table 14 below:

TABLE 14

| Fields | Description |
| --- | --- |
| Handle | Handle is used to discriminate a plurality of rights stored in the SRM. The Handle, which may have 10 bytes, is randomly generated by the DRM agent. The DRM agent identifies and selects particular rights from the plurality of rights through the Handle, and uses contents through the rights. The Handle has the same value as the Handle included in the Provisioning Setup Request message. |
| LAID | LAID (List of Asset ID) is a hash value of an Asset ID list related to corresponding rights. |
| Rights information | Rights information includes rights metadata, the RO container, and the state information. The rights metadata may include a RO version, a RO Alias, a RI identifier, a RI URI, a RI Alias, and a RI timestamp. The RO container includes <rights> element and <signature> element. When the RO is a stateful RO, the Rights information includes state information |

When the Right Provisioning Request message is received, the SRM agent stores the Handle and the rights information included in the message in the SRM (S173). The SRM agent then updates a Handle list. Through the updating of the Handle list, the Handle can be recognized even when the SRM is mounted in another terminal. The information stored in the SRM is as shown in Table 15 below:

TABLE 15

| Handle | Rights Information | LAID | REK |
|---|---|---|---|

When the installation is completed, the SRM agent transmits a Rights Provisioning Response message to the DRM agent (S174).

The Rights Provisioning Response message may include the field as shown in Table 16 below:

TABLE 16

| Field | Description |
|---|---|
| Status | Status indicates the processing results of the Rights Provisioning Request message. The status values are defined in TABLE 17 |

TABLE 17

| Status value | Description |
|---|---|
| Success | Rights Provisioning Request message has been successfully processed |
| Field Integrity Verification Failed | HMAC value of the Rights Provisioning Request message is inconsistent with HMAC value generated by the SRM agent |
| Handle Not Found | Handle included in Rights Provisioning Request message is not found in SRM |
| Handle Inconsistent | Handle included in Rights Provisioning Request message is different from Handle included in Rights Setup Request message |
| Not enough space | There is no extra storage space corresponding to Size of Rights in the SRM |
| Parameter failed | There is a problem in the structure or length of the rights provisioning request message |
| Unexpected request | Rights Provisioning Request message has been received in an erroneous order or Rights Provisioning Request message was a message not allowed |
| Unknown error | Unknown error has occurred |

When the Rights Provisioning Response message is received, the DRM agent determines whether or not the installation is successful, and if the installation is successful, the DRM agent deletes RO that the DRM agent has stored (S175). In detail, the DRM agent determines whether or not the value of the Status field of the Rights Provisioning Response message is 'Success'.

Figure 7:
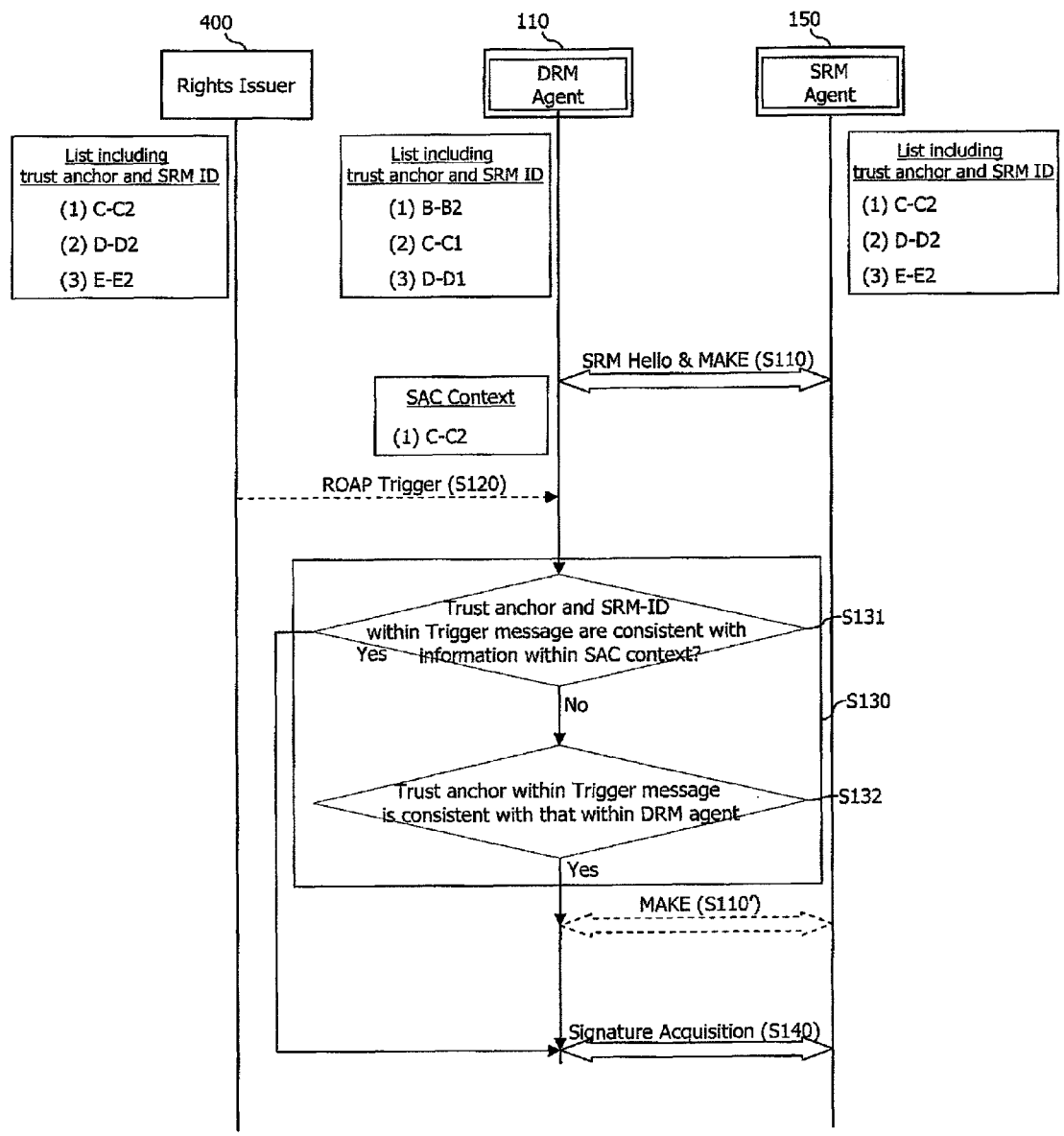
FIG. 7 is a flowchart showing in detail a trust model negotiation process shown in FIGS. 4 and 5.

FIG. 7 is a flowchart showing in detail a trust model negotiation process shown in FIGS. 4 and 6.

Referring to FIG. 6, it is assumed that the RI 400, the DRM agent within the terminal 100 and the SRM agent within the SRM 150 each have a list containing a pair of trust anchor TA and SRM ID.

The list belonging to the RI 400 includes, for example, C-C2, D-D2 and E-E2, and the list belonging to the DRM agent includes, for example, B-B2, C-C1 and D-D1. Also, the list belonging to the SRM agent includes, for example, C-C2, D-D2 and E-E2. The C-C2 denotes that a trust anchor is C and SRM ID is C2. Similarly, D-D2 denotes that a trust anchor is D and SRM ID is D2.

In the description with reference to FIG. 6 under this assumption, the DRM agent performs the HELLO and MAKE procedures (S110). Through the MAKE procedure, a SAC context for a SAC session is generated between the DRM agent and the SRM agent. The SAC context includes session key (SK) and MAC key (MK), information relating to a selected algorithm, a trust anchor and an entity ID, all negotiated between the DRM agent and the SRM agent. The negotiation of the trust anchor is achieved in a manner of negotiating trust models and designating a trust anchor within the negotiated models. The SAC context exemplarily shown in FIG. 7 includes C as a trust anchor and C2 as the SRM ID. Thus, when the SAC context is generated, the DRM agent can identify the SRM by using the C2 under the trust anchor C. Similarly, the SRM agent stores the terminal ID in the SAC context and is able to identify the terminal based upon the stored ID.

2) Meanwhile, the RI 400 transfers a trigger message, for example, ROAP Trigger message (S120). Here, the trigger message includes a list including a pair of a trust anchor for the SRM and SRM ID.

3) When the trigger message is received, the DRM agent performs a trust model negotiation process (S130), which will be explained in detail as follows.

The DRM agent compares the list included in the trigger message with the list within the SAC context (S131). In other words, the DRM agent confirms whether the list within the SAC context includes a trust anchor and SRM ID, which are consistent with those within the list included in the trigger message.

If there are the consistent trust anchor and SRM ID between the list included in the trigger message and the list within the SAC context, the DRM agent performs a signature acquisition process (S140).

However, if there are not any consistent trust anchor and SRM ID, the DRM agent then confirms whether the trust anchor and the SRM ID within the list included in the trigger message are consistent with the trust anchor of the SRM and the SRM ID stored in the DRM agent (S132). That is, the DRM agent confirms whether it supports the trust anchor within the trigger message. If it does not support the trust anchor within the trigger message, the DRM agent regards the trust model negotiation as failed, and terminates the process.

If there are the trust anchor and the SRM ID consistent with those stored in the DRM agent (namely, if the DRM agent supports the trust anchor within the trigger message), the DRM agent re-performs the MAKE procedure with the SRM agent by using the trust anchor (S110'). To this end, the DRM agent transmits an Authentication Request message including information related to the consistent trust anchor and SRM ID pair to the SRM agent. The Authentication Request message may include information related to the trust anchor, which is present within the trigger message and supported by the DRM agent, or the trust anchor. If the DRM agent has deleted the list of the trust anchor of the SRM and the SRM ID received via the SRM Hello message at S110 for a particular reason, the DRM agent performs the SRM Hello procedure prior to the MAKE procedure, to ensure the list of the trust anchor of the SRM and the SRM ID within the memory of the DRM agent itself. If the SRM agent supports the trust anchor within the Authentication Request message, the SRM agent transmits a normal Authentication Response message. However, if it does not support the trust anchor within the Authentication Request message, the SRM agent transmits the Authentication Response message by setting the state of the same message to 'Trust anchor not supported.'

If the state of the Authentication Response message is 'Trust anchor not supported', the DRM agent confirms whether there is another trust anchor supported by itself, and if present, repeats the MAKE procedure $i^{th}$ times based upon the another trust anchor. However, if the state of all the Authentication Response message received after the $i^{th}$ repetition is still 'Trust anchor not supported', the DRM agent considers the state as non-existence of a consistent trust anchor among the RI 400, the DRM agent and the SRM agent, and notifies the user of the final error. The DRM agent then optionally transmits a trigger error report message, for example, Trigger Error Report, to the RI 400. Here, the Trigger Error Report message includes a status parameter indicating 'Trust anchor not supported'.

The trust model negotiation process 130 has been described so far in detail. However, the trust model negotiation process may not be limited to the aforesaid description; but be varied in several different ways.

For instance, the SAC context includes only one trust anchor and SRM ID pair. However, upon performing the HELLO and MAKE procedures (S110), since the DRM agent receives the list of the trust anchor and SRM ID pairs supported by the SRM agent, the DRM agent may store the list of the trust anchor and SRM ID pairs received from the SRM agent, in addition to the SAC context. Hence, the DRM agent can confirm at the process S132 whether the trust anchor and SRM ID pair within the list included in the trigger message is consistent with not only the list of the DRM agent but also the list of the SRM agent.

Figure 8:
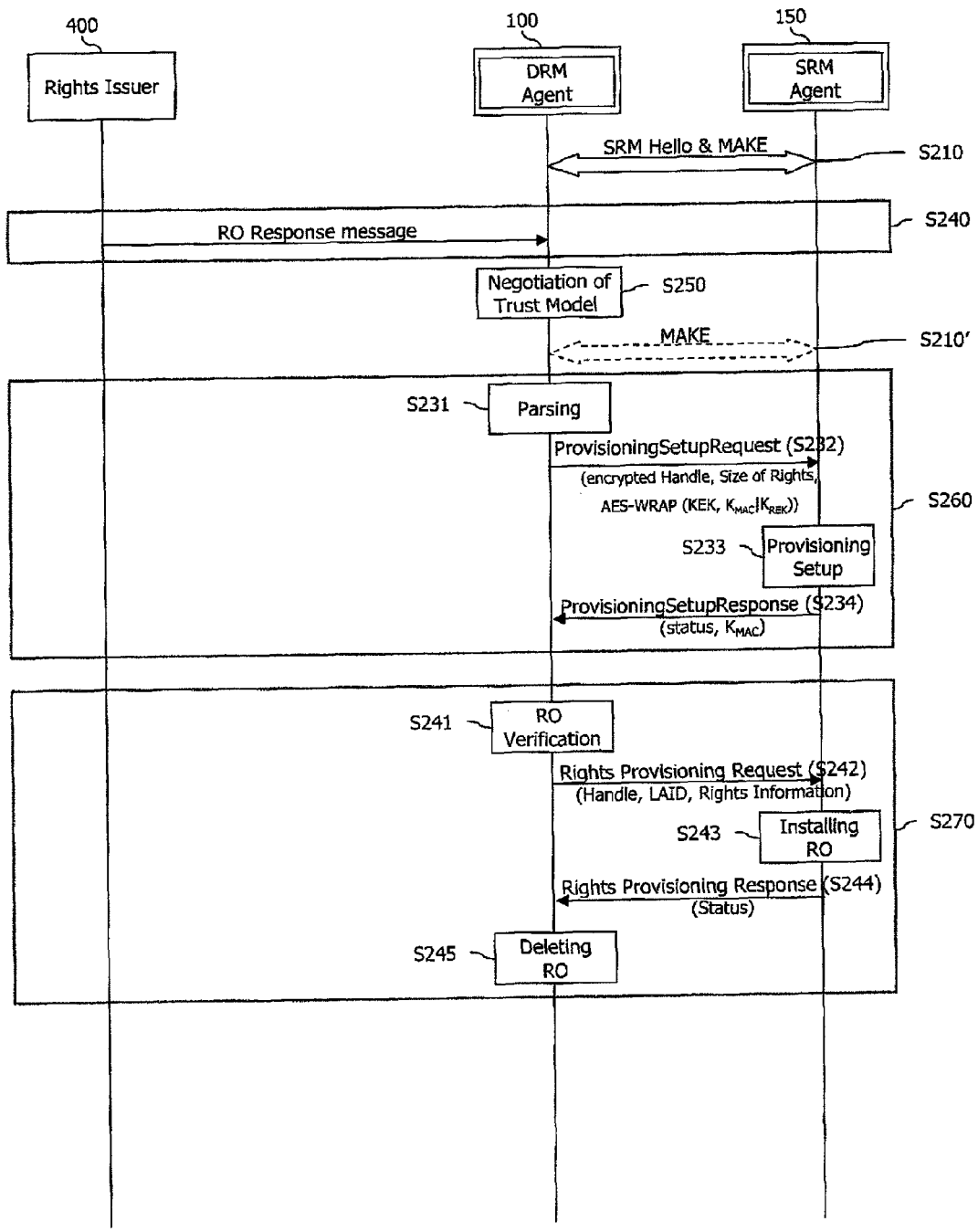
FIG. 8 is a flowchart illustrating a method according to a second exemplary embodiment of the present invention.

FIG. 8 is a flowchart illustrating a method according to a second exemplary embodiment of the present invention.

As shown in FIG. 8, in the method according to the second exemplary embodiment, unlike the first embodiment, the Trigger message and the RO Request message are not received, and only the RO Response message is received. This is referred to as a push model, which will be explained in detail as follows.

1) A process S210 can be easily understood by a person skilled in the art with reference to the process S110 of FIGS. 5 and 6, so a detailed description thereof will not be given.

2) The DRM agent receives a RO response message, for example, RO Response, from the RI 400 (S240). The RO Response message may be received by a user's request via a browsing session with the RI 400. For example, the user may requests a RO in the name of the SRM via the browsing session. Thus, information related to the SRM (i.e., the list of trust anchor and SRM ID pairs) and information related to the terminal 100 (i.e., Device ID, etc.) may be transferred to the RI 400 via the browsing session.

The RO Response message, as aforementioned, includes the protected RO (protectedRO). The protected RO includes a <ro> element and a <mac> element. The <ro> element is a <ROPayload> type and is as shown in Table 3.

However, the second embodiment further include TrustAnchorAndSRM IDPair, as shown in Table 18 below, in addition to the information shown in Table 3. The TrustAnchorAndSRM IDPair may be included in the form of a list of SRM IDs and trust anchors supportable by the SRM among trust anchors supported by the RI 400.

TABLE 18

```
<sequence maxOccurs="unbounded">
    <element name="encKey" type="xenc:EncryptedKeyType"/>
    <element     name="trustAnchorAndsrmIDPair"
    type="roap:trustAnchor
AndsrmIdentifierPairType" minOccurs="0"/>
</sequence>
```

3) Upon receiving the RO Response message, the DRM agent determines whether the message is for itself or for the SRM 150, and verifies the message.

The DRM agent then negotiates a trust model (S250). Afterwards, the DRM agent selectively performs the SRM HELLO and MAKE procedures, which will be explained later with reference to FIG. 9.

In the meantime, processes S260 and 270 are the same as the processes S160 and S170 of FIG. 6, which will be thusly understood by the description of FIG. 6.

Figure 9:
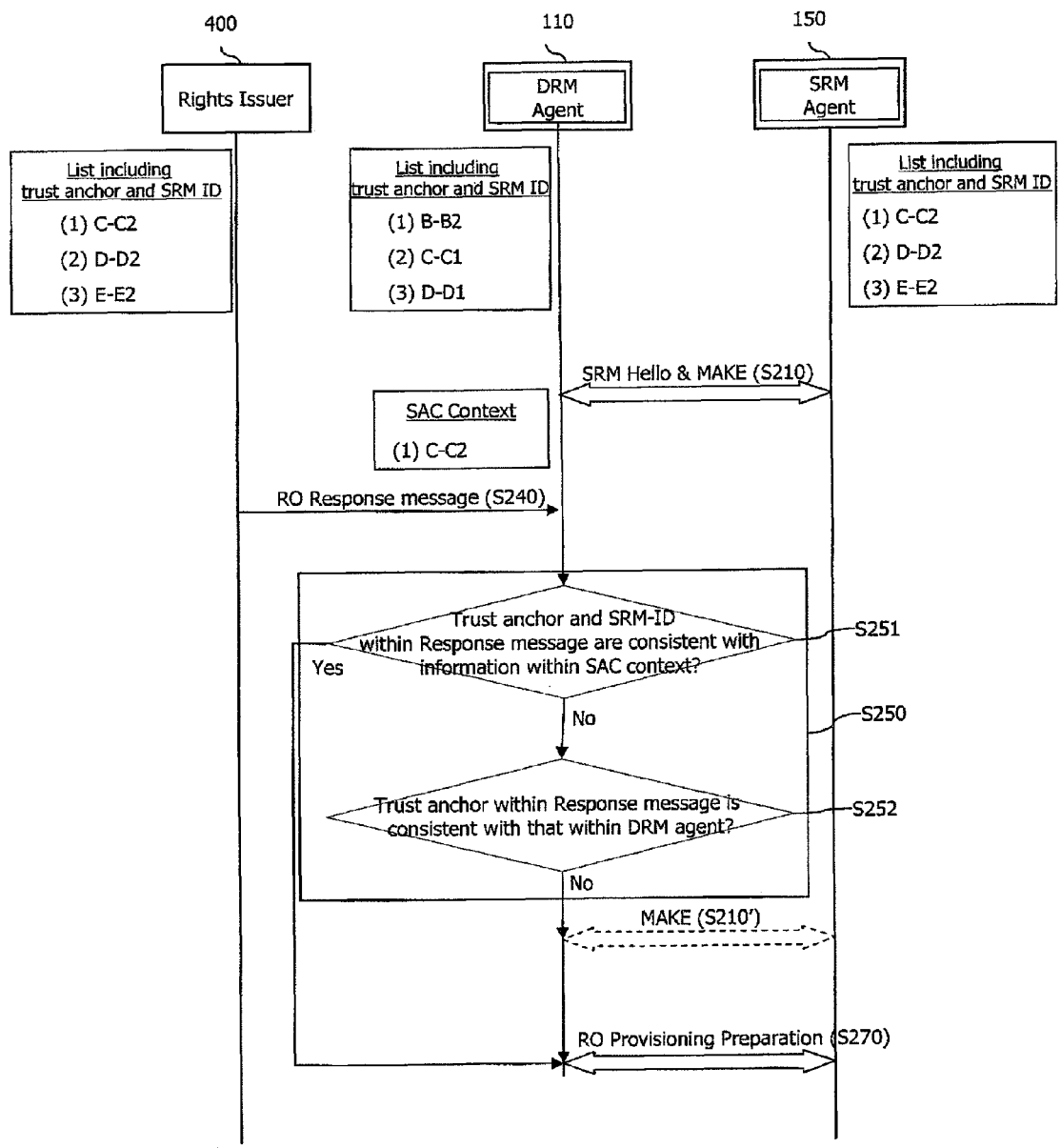
FIG. 9 is a flowchart showing in detail a trust model negotiation process shown in FIG. 8.

FIG. 9 is a flowchart showing in detail a trust model negotiation process shown in FIG. 8.

As shown in FIG. 9, processes or steps are similar to the processes or steps of FIG. 7. Therefore, only different processes will be described in detail, and the same processes will be briefly described.

1) The DRM agent performs the HELLO and MAKE procedures (S210), which are the same as those of FIG. 7.

2) The RI 400 transfers a RO response message, for example, RO Response message (S240). Here, the RO Response message includes a list of trust anchor and ID pairs for the SRM.

3) When the RO Response message is received, the DRM agent performs the trust model negotiation process (S250).

Here, as aforementioned, if the state of all the Authentication Response message received after the $i^{th}$ repetition is 'Trust anchor not supported', the DRM agent optionally transmits a RO confirm request report message, for example, RO Confirm Report message to the RI 400. Here, the RO Confirm Report message includes a status parameter indicating 'Trust anchor not supported'.

Figure 10:
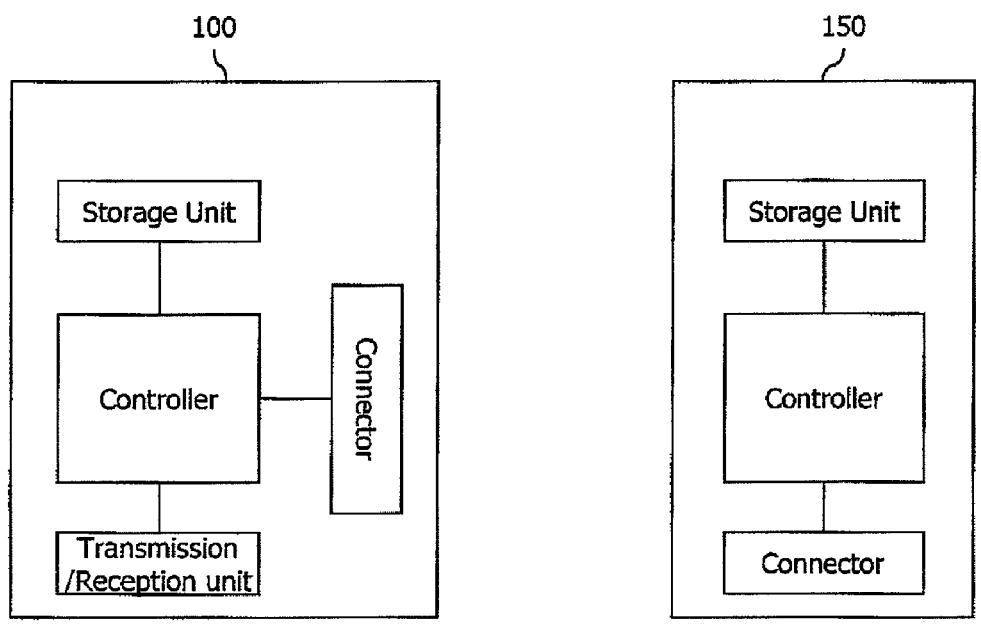
FIG. 10 is a schematic block diagram of a terminal 100 and an SRM 150 according to an exemplary embodiment of the present invention.

FIG. 10 is a block diagram of a terminal 100 and an SRM 150 according to an exemplary embodiment of the present invention.

As shown in FIG. 10, the terminal 100 includes a storage unit, a transmission/reception unit, a connector and a controller. The memory card, namely, the SRM, includes a storage unit, a connector and a controller.

The connector connects the terminal 100 to the memory card, namely, the SRM.

The storage units store a software program for implementing the method illustrated in FIGS. 4 to 8. The storage units store information of each received message.

Each of the controllers controls the storage units and the transmission/reception units. In detail, the controllers executes the methods stored in the storage units, respectively. Each controller transmits the above-described signals via the transmission/reception units.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of receiving, by a terminal, a rights object (RO) from a rights issuing server on behalf of a memory card, the method being initiated by receiving, by the terminal, a trigger message for acquiring the rights object, the method comprising:

comparing, by the terminal, a first pair of data items including a trust anchor and an ID of the memory card being included in the trigger message with a second pair of data items including a trust anchor and an ID of the memory card within a Secure Authenticated Channel (SAC) context which was generated by a mutual procedure between the terminal and the memory card; and if a result of the comparison indicates that the first pair of data items are inconsistent with the second pair of data items, identifying, by the terminal, another trust anchor that is included in the trigger message and is also supported by the terminal;

performing, by the terminal, a mutual authentication procedure with the memory card, wherein the mutual authentication procedure comprises:

transmitting an authentication request message from the terminal to the memory card, wherein the authentication request message includes the another trust anchor, and receiving, by the terminal from the memory card, an authentication response message including information indicating that the another trust anchor is supported by the memory card;

transmitting, by the terminal, a RO request message including the ID of the memory to the rights issuing server; and receiving, by the terminal, a RO response message including a protected RO from the rights issuing server.

2. The method of claim 1, further comprising:
prior to the comparison, confirming whether or not the trigger message includes the first pair of data items; and
if the trigger message includes the first pair of data items, determining that the trigger message is for the memory card.

3. The method of claim 1, further comprising:
transmitting, by the terminal, a RO request message to the rights issuing server if the comparison results indicates that the first pair of data items are consistent with the second pair of data items.

4. The method of claim 1, wherein the protected RO is encrypted using a public key of the memory card, and the public key is provided from a trust anchor to be supported by the memory card.

5. The method of claim 1, wherein the transmitting of the RO request message comprises:
generating, by the terminal, the RO request message on behalf of the memory card;
transmitting, by the terminal, a signature query request message to the memory card, the signature query request message including the RO request message;
receiving a signature query response message from the memory card, the signature query response message including a signature of the memory card; and
transmitting the RO request message including the signature of the memory card.

6. The method of claim 1, further comprising:
parsing the protected RO, wherein during the parsing, rights are extracted from the RO and converted into rights information as a format to be stored in the memory card;
generating an identifier for identifying the rights information to be stored in the memory card;
transmitting a provisioning setup request message to the memory card, the provisioning setup request message including the identifier and information related to the size of the rights information;
receiving a provisioning setup response message including a status of the provisioning setup from the memory card; and
transmitting a rights provisioning request message including the rights information to the memory card to install the rights information into the memory card if the status is success.

7. A terminal, receiving a rights object (RO) on behalf of a memory card, the terminal comprising:
a transmission/reception unit configured to receive a trigger message for a RO acquisition from a rights issuing server; and
a processor configured to control the transmission/reception unit to:
compare a first pair of data items including a trust anchor and an ID of the memory card being included in the trigger message with a second pair of data items including a trust anchor and an ID of the memory card within a Secure Authenticated Channel (SAC) context which was generated by a mutual procedure between the terminal and the memory card; and
if a result of the comparison indicates that the first pair of data items are inconsistent with the second pair of data items,
identify another trust anchor that is included in the trigger message and is also supported by the terminal;
perform a mutual authentication procedure with the memory card, wherein the mutual authentication procedure comprises:
transmitting an authentication request message from the terminal to the memory card, wherein the authentication request message includes the another trust anchor, and
receiving, by the terminal from the memory card, an authentication response message including information indicating that the another trust anchor is supported by the memory card;
transmit a RO request message including the ID of the memory to the rights issuing server; and
receive a RO response message including a protected RO from the rights issuing server.

8. The terminal of claim 7, wherein before the comparison, the processor determines that the trigger message is for the memory card, if the trigger message includes the first pair of data items.

9. The terminal of claim 7, wherein the processor is further configured to transmit a RO request message to the rights issuing server if the comparison results indicates that the first pair of data items are consistent with the second pair of data items.

10. The terminal of claim 7, wherein the protected RO is encrypted using a public key of the memory card, and the public key is provided from a trust anchor confirmed as being supported by the memory card.

* * * * *